Jan. 18, 1966  J. G. LINVILL  3,229,387
READING AID FOR THE BLIND
Filed Jan. 14, 1964  2 Sheets-Sheet 1

INVENTOR.
JOHN G. LINVILL
BY Samuel Lindenberg
ATTORNEY

Jan. 18, 1966    J. G. LINVILL    3,229,387
READING AID FOR THE BLIND
Filed Jan. 14, 1964    2 Sheets-Sheet 2
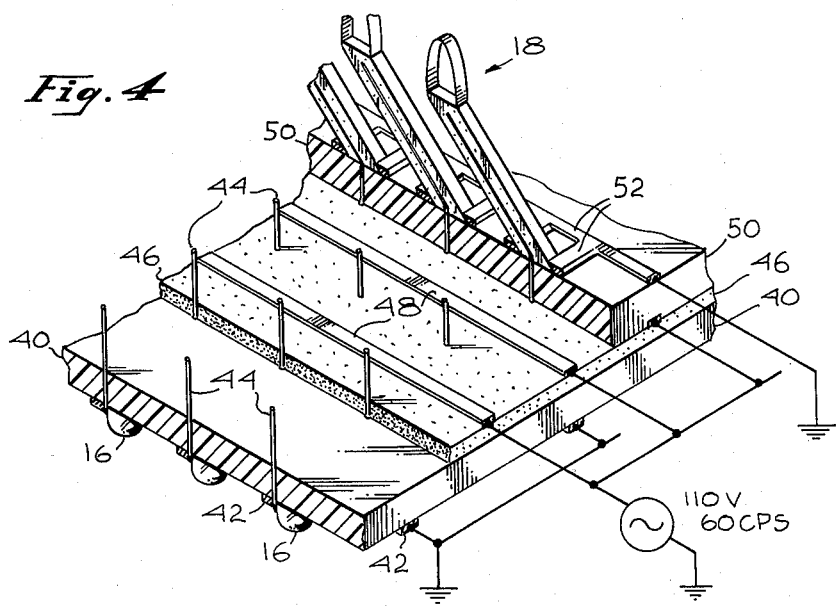
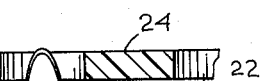
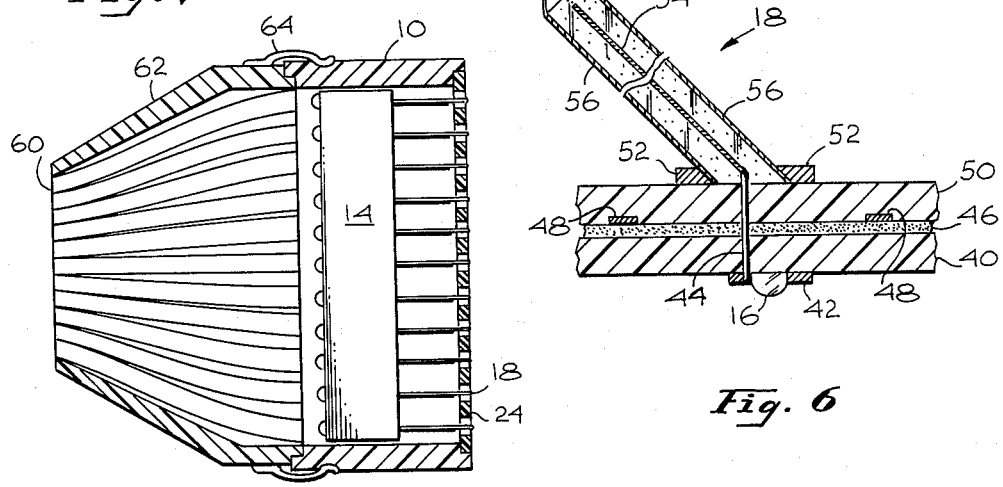
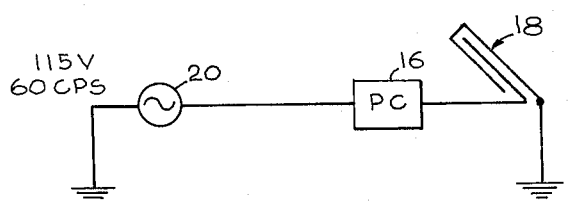
INVENTOR.
JOHN G. LINVILL
BY Samuel Lindenberg
ATTORNEY United States Patent Office 3,229,387
Patented Jan. 18, 1966

3,229,387
READING AID FOR THE BLIND
John G. Linvill, 30 Holden Court, Portola Valley, Calif.
Filed Jan. 14, 1964, Ser. No. 337,618
8 Claims. (Cl. 35—35)

This invention relates to devices for aiding the blind and in particular to devices which can convert visual images into tactual impressions.

Previously existing reading aids for the blind of the general type in which a tactual impression of the image is produced have had a number of shortcomings. For example, the individual elements making up the tactual image are static. That is, these elements assume either a fixed raised or a fixed lowered position. Such static images are difficult to sense. Furthermore, the individual elements which make up the tactual image have been driven by electromagnets and other inherently bulky devices. Also, the presently known devices for creating tactual images have required amplifiers to amplify the electrical energy of a photocell or similar device before converting this energy into the mechanical displacement of the elements making up the image.

An object of this invention is to provide a novel and improved apparatus for converting an optical image into an image which may be sensed tactually by a blind person.

Another object of this invention is to provide means for converting the light energy in discrete areas of an optical image into vibrations which may be sensed tactually by a blind person.

Still a further object of this invention is to provide a transducer for converting optical images into corresponding patterns of tactual stimulation.

Yet another object of this invention is to provide an improved device for aiding the blind to read printed material.

A further object of the invention is to provide a reading aid for the blind of greater compactness than has been possible heretofore.

A further object of the invention is to provide a reading aid for the blind which does not require amplifiers.

These and other objects of this invention may be achieved in an arrangement including a lens or other optical system for focusing an optical image upon a screen containing an array of photoconductive cells. These photoconductive cells are of the type whose resistance decreases as the light impinging upon them increases. Each of the photoconductive cells is connected in an electrical circuit with a piezoelectric reed and a source of alternating potential in such a manner that, as the resistance of the photoconductive cell decreases, the amount of alternating current reaching the piezoelectric reed will decrease so that the vibrations of the piezoelectric reed will become smaller in amplitude as more light impinges upon the photoconductive cell. The lens focuses an image of a scene upon the array of photoconductive cells. Those vibrating reeds which are associated with photoconductive cells in dark portions of the image will vibrate with greater amplitude whereas those reeds associated with photoconductive cells in light portions of the image will vibrate with lesser amplitude or will not vibrate at all. Thus, if the device is focused upon a printed letter, the pattern of the letter will appear as a pattern of vibrations capable of being sensed tactually. When the device is focused upon a scene containing moving objects, the pattern of vibration which is sensed tactually will be felt to move across the field of vibrating reeds.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(a) is a fragmentary side view of FIGURE 1.

FIGURE 4 is a cutaway view of a section of the transducer which converts the visual image of the scene to an embossed pattern of vibrations.

FIGURE 6 is an enlarged fragmentary cross section of a small section of the transducer, showing the relation between a single photoconductive cell and its associated vibrating piezoelectric element.

FIGURE 7 illustrates an alternative embodiment of the invention in which the lens is substituted for by an array of light fibres.

Figure 3:
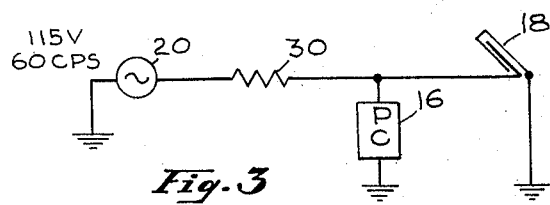
FIGURE 3 is a schematic drawing showing the interconnection of the power source, the photoconductive elements, and the vibrating element.

FIGURE 8 presents an alternative circuit arrangement to that shown in FIGURE 3. In this alternate arrangement, the amplitude of vibrations produced by each discrete area of a scene will be directly proportional to the light impinging upon that area.

Figure 1:
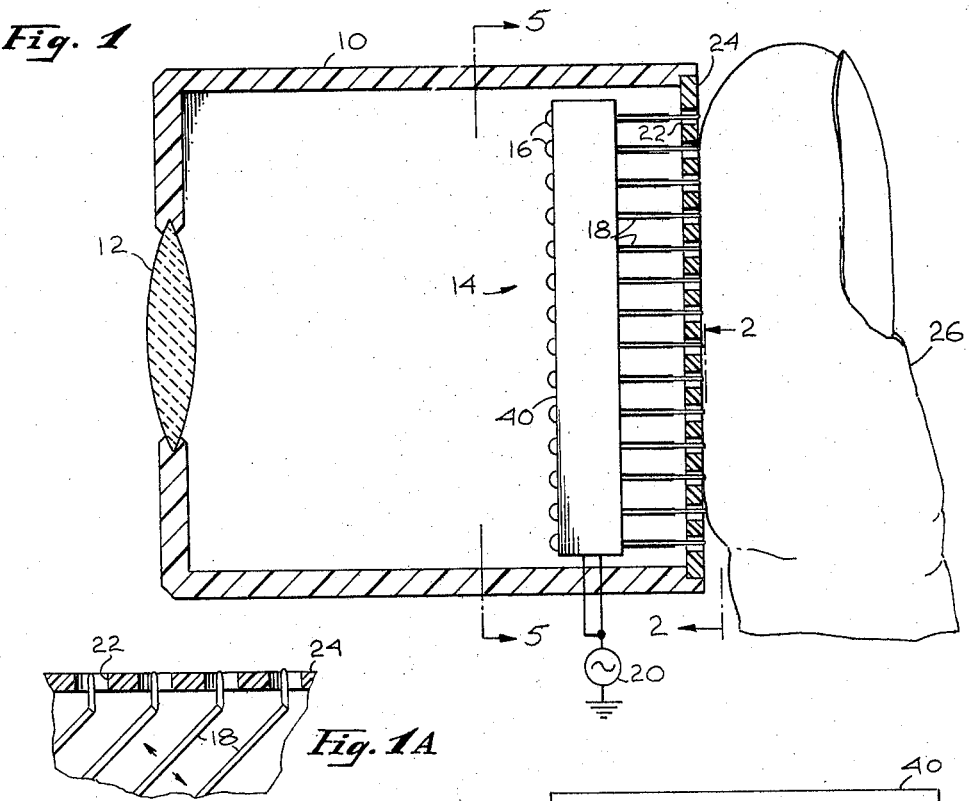
FIGURE 1 is a vertical section through the device of this invention.

Referring to the drawings in detail, FIGURE 1 shows the device of the invention as consisting of a frame 10 holding a lens 12 spaced from a transducer unit 14. The transducer unit 14 serves for converting optical energy into mechanical vibrations. The transducer unit includes an array of photoconductive cells 16 connected to electrical circuits to be described below, which in turn drive vibrating reeds 18. The transducer unit receives electrical power from a source 20 of alternating current. As may be seen in the side fragmentary view of FIGURE 1(a), the reeds make an angle of approximately 45° with the base plate 24, and their tips are slightly bent so that the tips of the reeds at rest are flush with the base plate 24. When the reeds vibrate, their ends project through hole 22 in the base plate 24, and these reeds can be sensed by the fingertip 26 when it is placed against the base plate. The vibrations of groups of reeds forming a pattern may be sensed by placing a finger 26 or other body surface against the base plate. Each photocell 16 controls the amount of alternating current driving the vibrating reed associated with it. As a result, each of the vibrating reeds 18 will vibrate with an amplitude which is inversely proportional to the intensity of the light falling upon the individual photo-conductive cell associated with it.

Figure 2:
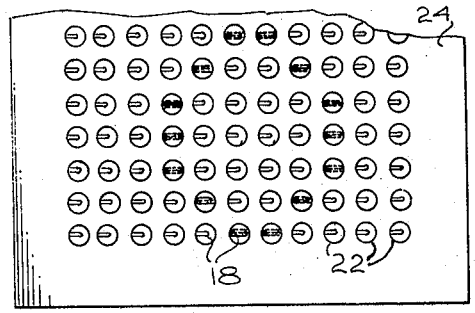
FIGURE 2 is a cross section along the line 2—2 in FIGURE 1, showing the base plate with the vibrating elements which are to be tactually sensed by the blind person.

FIGURE 2 is a view in elevation along the line 2—2 of FIGURE 1 and shows the base plate 24 with vibrating reeds 18 protruding through holes 22. The pattern of vibrations shown in FIGURE 2 would correspond to the visual image of the letter O, or of a circle.

FIGURE 3 is a circuit diagram of the electrical circuit used for driving an individual photocell from the vibrating piezoelectric reed associated with it. There is one such circuit for each photocell in the transducer unit.

A source of alternating potential 20 is connected between ground and one end of a resistor 30. The other end of resistor 30 is connected to a photocell 16. The other end of the photocell 16 is connected to ground. A piezoelectric reed 18 is connected in parallel with photocell 16. The photocell 16 is of the photoconductive type such as cadmium sulphide. Piezoelectric reed 18 has the property of vibrating in flexure when a source of alternating potential is applied to it.

In piezoelectric reeds or "bimorphs" of this type, a pair of strips of piezoelectric ceramic are laid on a center gold vane. The outer surfaces parallel to the vane are coated with conductive material. Application of an alternating potential between the outer conductor and the center vane causes the piezoelectric reed to vibrate in flexure.

In the circuit of FIGURE 3 the source of alternating potential is connected to the center vane of the piezoelectric reed and the outer conductor is connected to ground.

With no light impinging on the photoconductive cell, its resistance will be of the order of magnitude of one megohm, but with light impinging upon it, this resistance will fall to the order of magnitude of 30,000 ohms. It is, of course, to be understood that these values are quoted for illustrative purposes only. When light is applied to the photocell, therefore, its resistance falls so that a large potential drop takes place across resistor 30. As a result, there is insufficient potential to cause the piezoelectric reed 18 to vibrate. Since the resistance of photoconductive cell 16 varies directly with the amount of light falling upon it, the amplitude of the vibrations of the piezoelectric reed will vary inversely as the light falling upon the photoconductive cell.

FIGURE 4 illustrates the mechanical construction of the transducer 14. It represents an enlarged fragmentary view of the transducer turned on its side with the photoconductive cells 16 at the bottom of the drawing and the piezoelectric reeds at the top. The photoconductive cells 16 are mounted on an insulating board 40. One terminal of each of the photoconductive cells is attached to printed circuit wires 42 which are printed on the surface of the insulating board 40. The printed circuit wires 42 form a grid which is connected to ground.

Figure 5:
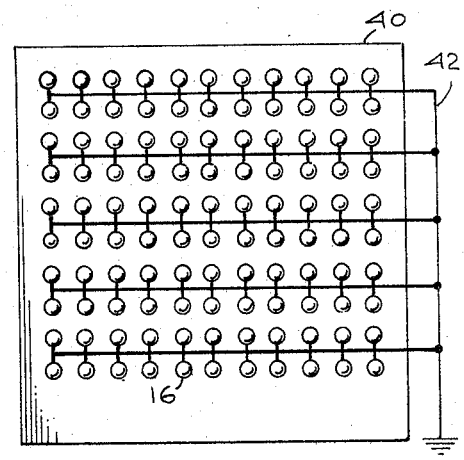
FIGURE 5 is a cross section along the line 5—5 in FIGURE 1, showing the array of photoelectric cells with the printed circuit ground wire connecting one terminal of each of these cells to ground.

FIGURE 5 shows the arrangement of the face of the insulating board 40 containing the photoconductive cells 16, one side of each of which is connected to one of the printed circuit wires 42 which are connected to ground.

Returning to FIGURE 4, the outer terminal of each of the photoconductive cells 16 is connected to a wire 44. These wires project through the insulating board 40 to a layer 46 above it. Layer 46 consists of a deposit carbon resistive surface. This resistive surface 46 corresponds to the resistor 30 of the schematic drawing FIGURE 3.

Printed on resistive surface 46 are printed circuit conductors 48. These conductors have one of their ends connected to a source of alternating potential such as a 110 volt 60-cycle line.

Above the deposited resistive layer 46 is a second insulating layer 50. Wires 44 project through the insulating layer 50 and are connected to the center vane of the piezoelectric reeds 18.

The piezoelectric reeds 18 are mounted on the opposite surface of insulating layer 50 from the deposited resistor 46. The ground terminals of the piezoelectric reeds are connected to printed circuit wires 52 and these printed circuit wires 52 in turn are connected to ground.

The advantage of the mode of construction shown in FIGURE 4 is that it makes possible a compact transducer of a size which is practical for a blind person to carry in his hand. The transducer, it will be seen, requires no amplifiers and no bulky components. The piezoelectric reeds are of such a size that densities of 100 or more reeds per square inch of surface are possible while maintaining isolation between each other.

FIGURE 6, is a magnified fragmentary view of a section of the transducer shown in FIGURE 4. In FIGURE 6, only one photoconductive cell with its associated reed and the section of the transducer between them are shown. Photoconductive cell 16, as has been indicated previously, has one of its terminals connected to grounding wire 42 and the other of its terminals connected to conductor 44. Conductor 44 goes through deposited resistor 46. Conductors 48 are connected to a source of alternating potential so that conductor 44 is connected to this source through deposited resistor 46. Conductor 44 is also connected to one terminal of piezoelectric reed 18. This terminal is connected to the center vane of the piezoelectric reed. Piezoelectric reed 18 consists of a pair of strips of piezoelectric ceramic which are laid on a center gold vane 54. Each of the outer surfaces parallel to the vane are coated with a conductor 56. The outer conductors 56 are connected to grounding strips 52. The grounding strips 52 are printed on insulating board 50. The tip of piezoelectric reed protrudes through base plate 24 when the reed flexes so that its vibrations may be sensed by the finger of the blind person.

FIGURE 7 illustrates an alternative optical arrangement for the device. In place of the lens of FIGURE 1, the device may be constructed using glass light fibers 60 for magnification of a film or similar source of visual material. Light fibers 60 are supported by frame 62 and the assembly of light fibers 60 and frame 62 may be clipped to frame 10 by spring clips 64. Assemblies of light fibers providing various magnifications may be made available for use with the transducer 14 to fit various sizes of visual material.

FIGURE 8 shows an alternative circuit configuration for the device. In the circuit of the device as depicted in FIGURE 3, the vibrations of the piezoelectric reeds will be at a maximum amplitude when the photoconductive cell has no light impinging upon it. The arrangement illustrated in FIGURE 3 is ideally suited to the reading of printed matter because in printed matter, the letters are dark and the background is generally white. However, there are applications of this device in which it may be desirable that the amplitude of vibrations of the reed may be maximized where the maximum light impinges on the photoconductive cell. For example, the device may be used as an aid in sensing the movement of gross objects such as cars by a blind person while walking along the streets. In this application, it may be desirable that the maximum vibrations occur where the light is greatest. In FIGURE 8 the photoconductive cell is in series with the vibrating piezoelectric reeds 18. As light impinges upon the photoconductive cell, its resistance will fall and the amount of alternating potential presented to the piezoelectric reeds will rise.

In the illustrations, a source of 115 volts, 60-cycle per second power has been shown. Of course, it will be recognized that the device will operate equally well with any portable source of alternating potential such as a battery pack and vibrator.

While the foregoing description of the embodiment of the invention illustrates how the transducer is actuated in response to a light optical image to reproduce for the tactual sense images of characters seen by persons with normal vision, the invention may also be employed to provide tactual images in braille in response to scanning printed braille characters. Also braille characters may be punched in paper tape which can then be moved past this invention which then can serve as a tape reader for the blind. If braille characters are recorded on magnetic tape, then, by using a number of tape read heads, each scanning a different portion of a braille character, and each controlling a separate oscillator with its output, each oscillator output can be used for driving a separate reed disposed as indicated, with respect to the base plate whereby the magnetically recorded braille character is tactually displayed.

While a specific embodiment of the invention has been described and illustrated, it will be understood that various modifications may be made within the scope of the appended claims without departing from the spirit of the invention.

I claim:
1. Apparatus for converting an optical image to a vibratory image which may be sensed tactually comprising a plurality of separate piezoelectric vibratory reed means disposed in an array, means for vibrating each of said separate piezoelectric vibratory reed means with an amplitude representative of the light from a different region of said image including a photoconductive means for each region for providing an alternating current having an amplitude representative of the light from said region, and means for applying each said alternating current to each said separate piezoelectric vibratory reed means.

2. Apparatus for converting an optical image to a vibratory image which may be sensed tactually comprising a plurality of separate vibrator reed means disposed in an array, a plurality of separate photoconductive means disposed in an array, there being a photoconductive means for each vibratory reed means which is associated therewith, means for applying said optical image to said array of photoconductive means for providing an array of the resistance values of said array of photoconductive means representative of said optical image, means for applying alternating current to each of said photoconductive means to obtain an alternating current output signal therefrom having an amplitude determined by the resistance of said photoconductive means, and means for applying the alternating current output signal from each said photoconductive means to its associated vibratory reed means to cause each reed to vibrate in accordance with the amplitude of each said signal to establish a vibration pattern representative of said optical image.

3. Apparatus as recited in claim 2 wherein said means for applying said optical image to said array of photoconductive means includes a plurality of glass light fibers extending between said optical image and said array of photoconductive means.

4. Apparatus for converting an optical image to a vibratory image which may be sensed tactually comprising a plurality of photoconductors arranged in an array, a plurality of vibratory reeds arranged in an array, an oscillating current source, means applying said oscillating current source directly to said plurality of photoconductors to produce an oscillating current output from each photoconductor having an amplitude determined by the resistance value of said photoconductor, means for applying said optical image to said plurality of photoconductors to alter the resistances thereof in accordance with light variations of said optical image, and means for connecting each of said plurality of photoconductors to a different one of said vibratory reeds for vibrating each reed from the output of each photoconductor with an amplitude representative of the resistance value of each photoconductor.

5. Apparatus for converting an optical image to a vibratory image which may be sensed tactually comprising a plate against one side of which a tactually sensitive body member may be placed, said plate having a plurality of apertures therethrough arranged in an array, a plurality of vibratory reeds positioned on the other side of said plate, means supporting said plurality of reeds for extending their tips through the apertures of said plate only when they are vibrating, a plurality of photoresistors arranged in an array, means for applying said optical image to said photoresistors to vary the resistance values thereof in accordance with the light variations of said optical image, a source of alternating current having a pair of output terminals, a resistor for each photoresistor, a connection between one end of each resistor and one end of each photoresistor, means connecting each resistor and photoresistor between said pair of output terminals of said source of alternating current, and means connecting each of said plurality of reeds across a different one of said photoresistors for vibrating each reed with an amplitude inversely proportional to the resistance value of the photoresistor to which it is connected.

6. Apparatus for converting an optical image to a vibratory image which may be sensed tactually comprising a plate against one side of which a tactually sensitive body member may be placed, said plate having a plurality of apertures therethrough arranged in an array, a plurality of vibrating reeds positioned on the other side of said plate, means supporting said plurality of reeds to extend their tips through the apertures of said plate only when in the vibratory mode, a plurality of photoresistors arranged in an array, means for applying said optical image to said photoresistors to vary the resistance values thereof in accordance with the light variations of said optical image, a source of alternating current having a pair of output terminals, means connecting one end of each photoresistor to one output terminal of said source of alternating current, and means connecting each one of said reeds between the other end of each photoresistor and the other of said output terminals of said source of alternating current for vibrating each reed with an amplitude inversely proportional to the resistance of the photoresistor to which it is connected.

7. Apparatus as recited in claim 6 wherein said means supporting said plurality of reeds to extend their tips through the apertures of said plate only when in the vibratory mode supports said reeds at an angle to said plate.

8. Apparatus as recited in claim 2 wherein said vibratory reeds are piezoelectric reeds.

References Cited by the Examiner
UNITED STATES PATENTS

| | | | |
|---|---|---|---|
| 1,487,115 | 3/1924 | McQuarrie | 35—35.1 X |
| 2,327,222 | 8/1943 | Sell | 35—35.1 X |
| 2,866,279 | 12/1958 | Surber | 35—35.1 |
| 2,972,140 | 2/1961 | Hirsch | 35—35.1 X |
| 2,983,903 | 9/1961 | Philipps | 310—8.3 X |
| 3,050,248 | 8/1962 | Lindquist | 35—48 X |
| 3,125,812 | 3/1964 | Simpson | 35—3 |

EUGENE R. CAPOZIO, *Primary Examiner.*

LAWRENCE CHARLES, *Examiner.*

W. GRIEB, *Assistant Examiner.*